US011354104B2

(12) United States Patent
Licata et al.

(10) Patent No.: US 11,354,104 B2
(45) Date of Patent: *Jun. 7, 2022

(54) COMPUTER-BASED SYSTEMS CONFIGURED TO MANAGE CONTINUOUS INTEGRATION/CONTINUOUS DELIVERY PROGRAMMING PIPELINES WITH THEIR ASSOCIATED DATAPOINTS AND METHODS OF USE THEREOF

(71) Applicant: Capital One Services, LLC, McLean, VA (US)

(72) Inventors: Christopher Marc Licata, McLean, VA (US); Jeremy Green, McLean, VA (US); Nicholas Lykins, McLean, VA (US); Annemarie Daddis, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/940,030

(22) Filed: Jul. 27, 2020

(65) Prior Publication Data
US 2021/0099546 A1    Apr. 1, 2021

Related U.S. Application Data

(63) Continuation of application No. 16/588,263, filed on Sep. 30, 2019, now Pat. No. 10,728,364.

(51) Int. Cl.
*G06F 8/60*    (2018.01)
*H04L 67/00*    (2022.01)
(Continued)

(52) U.S. Cl.
CPC .............. *G06F 8/60* (2013.01); *G06F 8/433* (2013.01); *G06F 16/245* (2019.01);
(Continued)

(58) Field of Classification Search
CPC ....... H04L 67/025; H04L 67/10; H04L 67/20; H04L 67/34; G06F 8/40–71; G06F 16/245
See application file for complete search history.

(56) References Cited

U.S. PATENT DOCUMENTS

| 5,805,891 A | * | 9/1998 | Bizuneh | G06F 8/70 709/220 |
| 9,170,798 B2 | | 10/2015 | Nagaraja et al. | |

(Continued)

OTHER PUBLICATIONS

De Broy, V. et al., Building Lean Continuous Integration and Delivery Pipelines by Applying DevOps Principles: A Case Study at Varidesk, Proceedings of ESEC/FSE 2018, Oct. 2018, pp. 851-856, [retrieved on May 26, 2020], Retrieved from the Internet.

(Continued)

*Primary Examiner* — Geoffrey R St Leger
(74) *Attorney, Agent, or Firm* — Greenberg Traurig, LLP

(57) ABSTRACT

Systems and methods associated with performing checkpoint and build processing associated with a continuous integration/continuous deployment (CI/CD) pipeline. In one embodiment, an exemplary method may include identifying an outside dependence for a new cloud process to be integrated into a CI/CD build of a CI/CD pipeline, determining on a periodic or ongoing basis whether a current status of the outside dependence identifies it as incomplete such that a new cloud process would not perform as desired until the dependence is complete, preventing the new cloud process from being integrated into the CI/CD build until the current status indicates that the outside dependence is complete, and integrating the new cloud process into the CI/CD build when the current status indicates that the outside dependence is complete.

20 Claims, 7 Drawing Sheets

(51) Int. Cl.
*G06F 16/245* (2019.01)
*H04L 67/10* (2022.01)
*G06F 8/41* (2018.01)
*H04L 67/025* (2022.01)
*H04L 67/53* (2022.01)

(52) U.S. Cl.
CPC ............ *H04L 67/025* (2013.01); *H04L 67/10* (2013.01); *H04L 67/20* (2013.01); *H04L 67/34* (2013.01)

(56) References Cited

U.S. PATENT DOCUMENTS

| | | | | |
|---|---|---|---|---|
| 10,033,833 | B2 * | 7/2018 | Fu | ............................ H04L 67/34 |
| 10,387,410 | B2 | 8/2019 | Suleman et al. | |
| 10,990,366 | B2 * | 4/2021 | Kavanagh | ............... G06F 8/443 |
| 2008/0201705 | A1 | 8/2008 | Wookey | |
| 2013/0232463 | A1 * | 9/2013 | Nagaraja | ................... G06F 8/61 |
| | | | | 717/101 |
| 2013/0275960 | A1 | 10/2013 | Kirchev et al. | |
| 2015/0039292 | A1 * | 2/2015 | Suleman | ............... G06F 16/285 |
| | | | | 704/9 |
| 2017/0201569 | A1 * | 7/2017 | Fu | ....................... G06F 9/45558 |
| 2019/0347081 | A1 * | 11/2019 | Kavanagh | ........... G06F 11/3476 |
| 2019/0361688 | A1 * | 11/2019 | Chigakkagari | ........... G06F 8/71 |

OTHER PUBLICATIONS

Gallaba, K., Improving the Robustness and Efficiency of Continuous Integration and Deployment, IEEE International Conference on Software Maintenance and Evolution (ICSME), Sep. 9-Oct. 4, 2019, pp. 619-623, [retrieved on May 26, 2020], Retrieved from the Internet.

* cited by examiner

COMPUTER-BASED SYSTEMS CONFIGURED TO MANAGE CONTINUOUS INTEGRATION/CONTINUOUS DELIVERY PROGRAMMING PIPELINES WITH THEIR ASSOCIATED DATAPOINTS AND METHODS OF USE THEREOF

CROSS-REFERENCE TO RELATED APPLICATION(S) INFORMATION

This is a continuation of U.S. application Ser. No. 16/588,263, filed Sep. 30, 2019, now U.S. Pat. No. 10,728,364, which are incorporated herein by reference in entirety.

COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to an improved computer-based platform or system, improved computing devices and/or improved computing methods configured for one or more novel technological applications involving checkpoint and build processing associated with cloud-based software applications being executed as part of a continuous integration/continuous delivery (CI/CD) pipeline.

BACKGROUND OF TECHNOLOGY

A computer network platform or system may include a group of computers (e.g., clients, servers, smart routers, etc.) and other computing hardware devices that are linked together through one or more communication channels to facilitate communication, software management and/or coordinating separate processes, such as with execution in cloud-based computing environments.

Software developers often use continuous integration/continuous delivery (CI/CD) pipelines to build applications or functionality for desired environments by requisitioning and coordinating separate cloud processes. At present, managing separate cloud processes, such as aligning checkpoints, statuses and completion of tasks during build, can be limited by numerous restraints such as, without limitation, inoperability of distinct software packages/routines, etc. There is often no satisfactory mechanism for managing and/or aligning various cloud processes based on the completion of each service. Further, such drawbacks can be especially problematic when only a limited subset of cloud services are available, and/or when additional limitations are placed on which application mechanisms are available, e.g., due to security and/or privacy considerations or the like.

SUMMARY OF DESCRIBED SUBJECT MATTER

In some embodiments, the present disclosure provides various exemplary technically improved computer-implemented methods for performing checkpoint and build processing regarding software applications involved with a CI/CD pipeline, including a method having steps such as:

receiving, by at least one computer processor, an indication of at least one first new cloud process to be integrated into a continuous integration/continuous deployment (CI/CD) build of a CI/CD pipeline;

identifying, by the at least one computer processor, at least one outside dependence for the at least one first new cloud process;

wherein the at least one outside dependence comprises input data that is generated outside of one or both of: the at least one first new cloud process, and at least one computing activity performed outside of the at least one first new cloud process;

querying, by the at least one computer processor, an updatable centralized log to determine a current status of the at least one outside dependence;

wherein the updatable centralized log is configured to obtain, in real-time, outside dependencies associated with the CI/CD build of the CI/CD pipeline;

determining, by the at least one computer processor, on a periodic or ongoing basis, whether the current status of the at least one outside dependence identifies that the at least one outside dependence is incomplete so that the at least one first new cloud process would not perform as desired until the at least one outside dependence is complete;

wherein the current status is determined by one or both of:
(i) tracking datapoints transmitted from one or more third-party platforms associated with the outside dependence; and
(ii) tracking the datapoints existent on the one or more third-party platforms;

preventing, by the at least one computer processor, the at least one first new cloud process to be integrated into the CI/CD build of the CI/CD pipeline until the current status of the at least one outside dependence identifies that the at least one outside dependence is complete; and integrating, by the at least one computer processor, the at least one first new cloud process into the CI/CD build of the CI/CD pipeline when the current status of the at least one outside dependence identifies that the at least one outside dependence is complete.

In some embodiments, the present disclosure also provides exemplary technically improved computer-based systems and computer-readable media, including media implemented with and/or involving one or more software applications, whether resident on computer devices or platforms, provided for download via a server and/or executed in connection with at least one network such as via a web application, that include or involves features, functionality, computing components and/or steps consistent with any aspects set forth herein.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
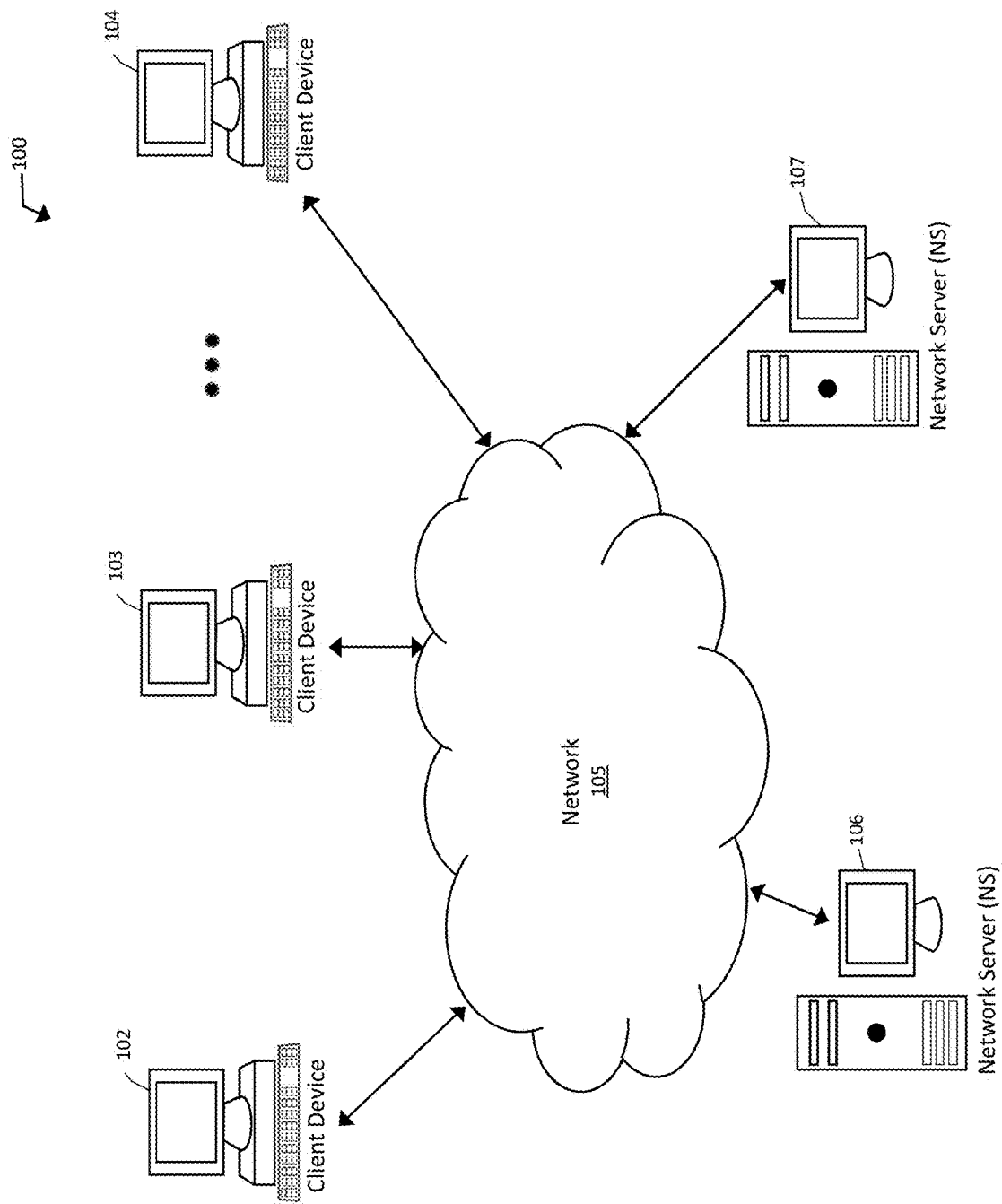
FIG. 1 is a block diagram depicting an exemplary computer-based system and/or platform that may involve features of checkpoint and build processing, in accordance with certain embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

Systems and methods associated with performing checkpoint and build processing of software applications, such as those assembled via cloud processes and associated with a CI/CD pipeline, are disclosed. According to the disclosed technology, solutions herein may involve managing CI/CD build processes including tracking of completion statuses among different separate cloud processes, and taking various actions based on datapoints regarding and/or completion of the underlying tasks and subtasks. In some embodiments, subsequent steps of a CI/CD pipeline execution may be managed and/or curtailed based on reporting and status information being generated and handled. Further, systems and methods herein may be especially applicable and specially designed for use in restrictive data environments, such as customer data environments that may be subject to data protection and/or data privacy rules or governances, or are otherwise limited only to services and activities approved for use therein. The disclosed embodiments may execute a method or pattern of checkpoint and build processing, including use of a tool or log external to the CI/CD pipeline that records and reports datapoints, which is configured to operate in conjunction with, and without violating, safeguards in place for particular data environments, such as environments that are especially strict in terms of security and best practices for protecting customer data.

In some embodiments, for example, execution and completion of dependent processes being spun up and executed from a CI/CD build may be aligned in connection with datapoints processed and reported by the external tool or log. Methods herein may originate from within a CI/CD pipeline execution though may track progress or completion of each process separately, wherein further execution of the pipeline build processes may be based on such tracking. Further, the present methods utilize other unique features, and involving the alignment of several different systems, to achieve objectives such as efficient completion of a CI/CD pipeline execution build. In some aspects, status, such as completion status, of the various separate processes may be captured, reported and processed such that execution of downstream steps in a CI/CD pipeline execution may be aligned and implemented based on those statuses.

FIG. 1 is a block diagram depicting an exemplary computer-based system and/or platform that may involve features of checkpoint and build processing, in accordance with certain embodiments of the present disclosure. It is noted, however, that not all of the illustrated components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform may be configured to manage a large number of processes and/or concurrent interactions, as detailed herein. In some embodiments, the exemplary computer-based system/platform may be based on a scalable computer and/or network architecture that incorporates various strategies for assessing the data, caching, searching, and/or database connection pooling. An example of the scalable architecture is an architecture that is capable of operating multiple servers.

In some embodiments, referring to FIG. 1, members 102-104 (e.g., clients) of the exemplary computer-based system/platform may include virtually any computing device capable of receiving and sending a message over a network (e.g., organization intranet, cloud network, etc.), such as network 105, to and from another computing device, such as servers 106 and 107, each other, and the like. In some embodiments, the member devices 102-104 may be personal computers, multiprocessor systems, microprocessor-based or programmable consumer electronics, network PCs, and the like, with some examples set forth in more detail, below, in connection with FIG. 7.

In some embodiments, the exemplary network 105 may provide network access, data transport and/or other services to any computing device coupled to it. In some embodiments, the exemplary network 105 may include and implement architecture for performing cloud-based computing and/or include or involve at least one specialized network architecture, as described in more detail below. In some embodiments, the exemplary server 106 or the exemplary server 107 may be a web or cloud server (or a series of servers) running a network operating system.

In some embodiments and, optionally, in combination of any embodiment described above or below, for example, one or more exemplary computing member devices 102-104, the exemplary server 106, and/or the exemplary server 107 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
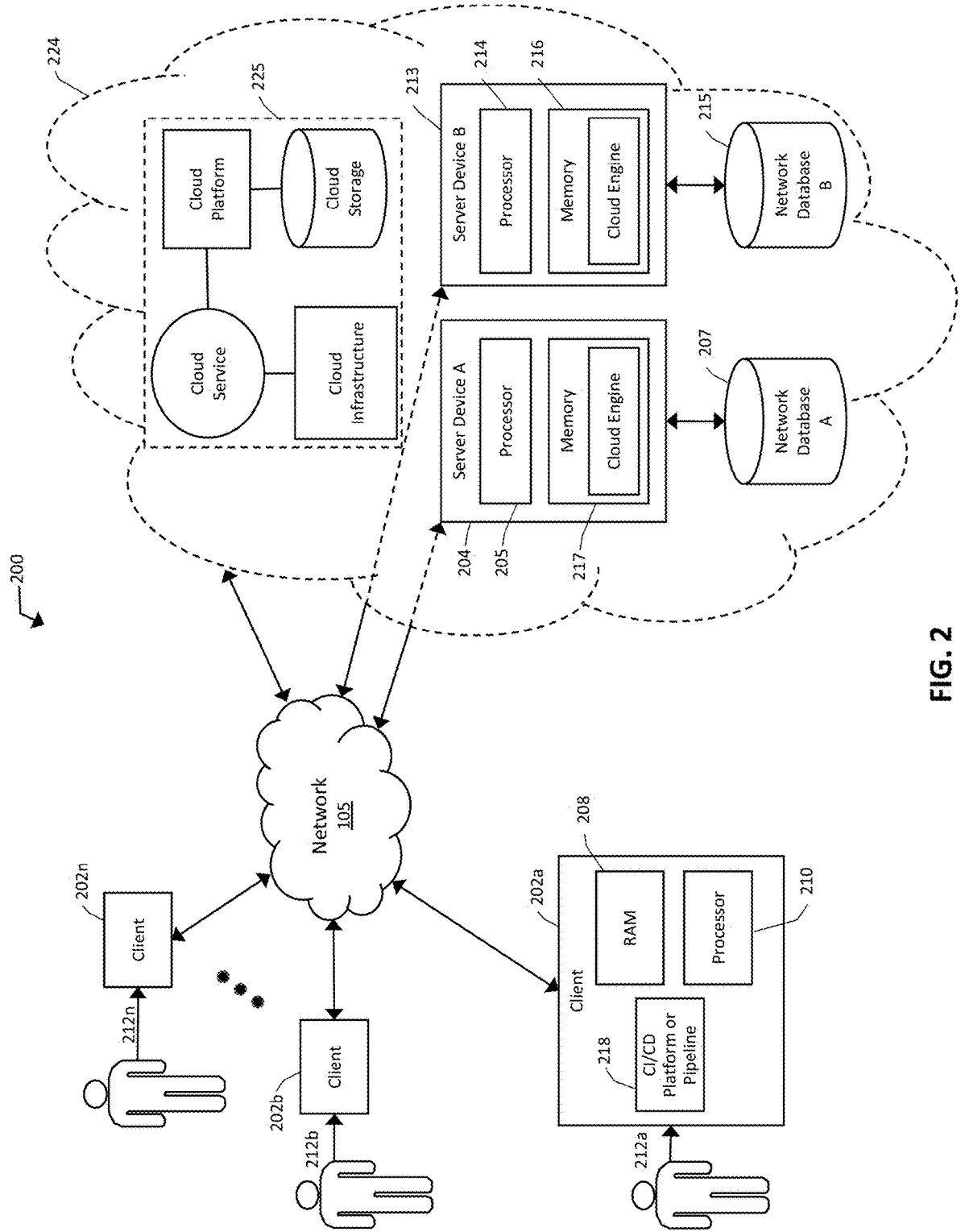
FIG. 2 is a block diagram depicting another exemplary computer-based system and/or platform that may involve features of checkpoint and build processing, in accordance with certain embodiments of the present disclosure.

FIG. 2 is a block diagram depicting another exemplary computer-based system and/or platform that may involve features of checkpoint and build processing, in accordance with certain embodiments of the present disclosure. It is noted that not all of these components may be required to practice one or more embodiments, and variations in the arrangement and type of the components may be made without departing from the spirit or scope of various embodiments of the present disclosure. In some embodiments, the member computing devices 202a, 202b through 202n shown each at least includes a memory 208, such as a random-access memory (RAM) and/or a computer-readable medium, which may be coupled to a processor 210. In some embodiments, the processor 210 may execute computer-executable program instructions stored in memory 208.

Referring to FIG. 2, various computer-executable instructions may be executed in connection with providing a continuous integration, continuous delivery (CI/CD) platform or pipeline 218 that the client 202a may utilize, e.g., to initiate, track and/or coordinate various cloud processes or services, such as those associated with a software or application build. Such CI/CD platform or pipeline 218 may be specific to a single application and executed using a CI/CD tool, like Jenkins. Further, in some implementations, client (e.g. 202a) may be associated with a financial service provider (FSP) entity that provides, maintains, manages, or otherwise offers financial services. For example, the financial service entity may be a bank, credit card issuer, or any other type of financial service entity that generates, provides, manages, and/or maintains financial service accounts for one or more customers. Financial service accounts may include, for example, credit card accounts, loan accounts, checking accounts, savings accounts, reward or loyalty program accounts, and/or any other type of financial service account known to those skilled in the art. In such instances, client 202a may be comprised of a plurality of servers including one or more servers or computer systems that implement the CI/CD platform or pipeline, which may be resident on other servers.

As shown in FIG. 2, exemplary clients 202 may be also coupled to one or more networks 105 as well as to one or more cloud computing environments 224, which may contain the various cloud processes and cloud services that the CI/CD pipeline 218 initiates, instructs and coordinates. As also shown in FIG. 2, exemplary cloud computing environment 224 may include and/or involve one or more servers 204, 213 and/or cloud components 225, which are shown grouped together in the drawing for sake of illustration, though may be distributed in various ways as known in the art. The various different servers 204, 213 may execute the separate cloud processes coordinated via embodiments herein, and each may contain processors 205, 214, memory 217, 216 and associated network or cloud engines. Cloud components 225 may include one or more cloud services such as software applications (e.g., queue, etc.), one or more cloud platforms (e.g., a Web front-end, etc.), cloud infrastructure (e.g., servers 204, 213, virtual machines, etc.), and/or cloud storage (e.g., cloud databases, network databases 207, 215, etc.), which are further discussed in connection with FIGS. 3 and 7.

In some embodiments, one or more databases, such as exemplary databases 207 and 215, may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

In FIGS. 1 and 2, while only one or several of the various system components are shown, it will be understood that these platforms 100, 200 may include more or fewer of any of these components, than depicted. More generally, the components and arrangement of the components included in these platforms 100, 200 may vary. Thus, platforms 100, 200 may include other components that perform or assist in the performance of one or more processes consistent with the disclosed embodiments. Another exemplary, generalized computing platform is further shown and described below in connection with FIG. 7.

Figure 3:
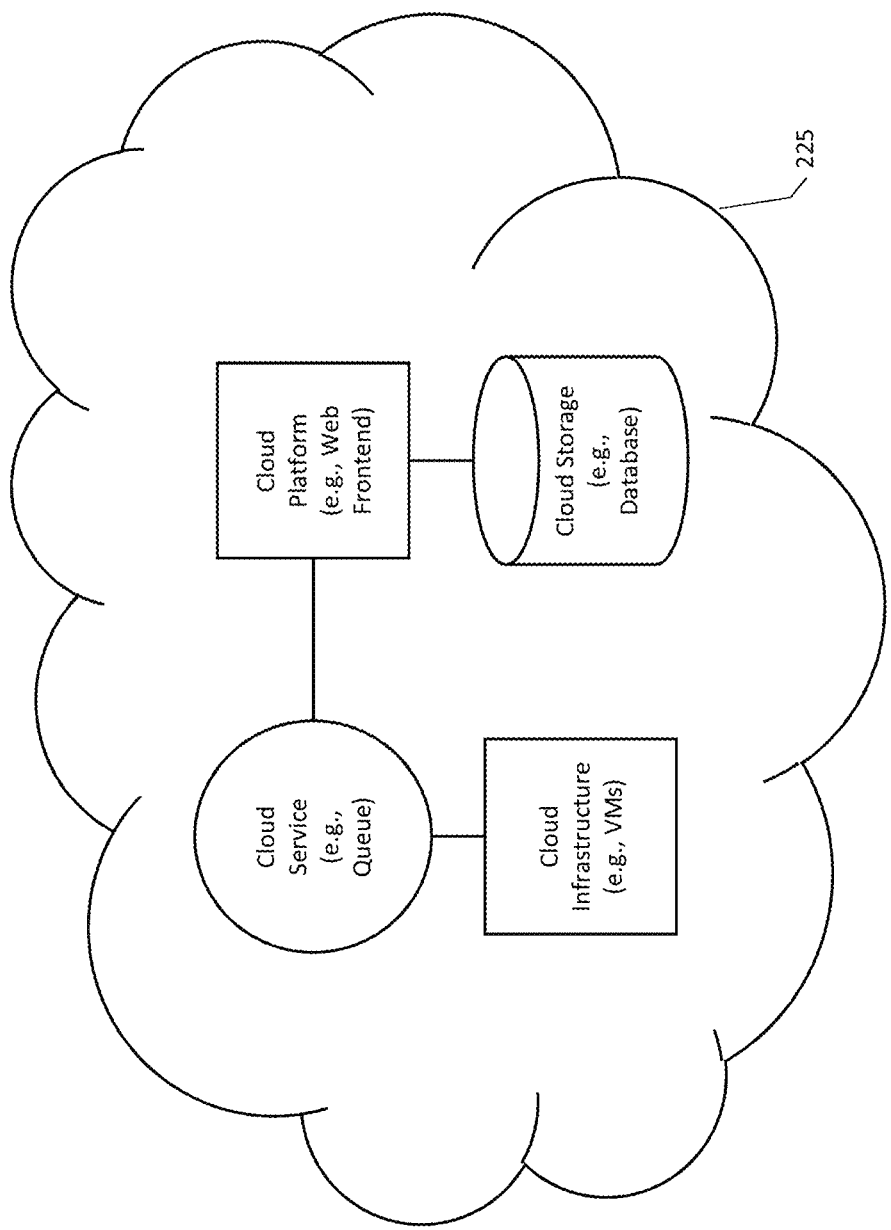
FIGS. 3 and 4 are diagrams illustrating two exemplary implementations of cloud computing architecture/aspects with respect to which the disclosed technology may be specifically configured to operate, in accordance with certain embodiments of the present disclosure.

As shown in FIGS. 2 and 3, various embodiments of the disclosed technology may include and/or involve one or more cloud components 225, which are shown grouped together in the drawing for sake of illustration, though may be distributed in various ways as known in the art. Cloud components 225 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

Figure 4:
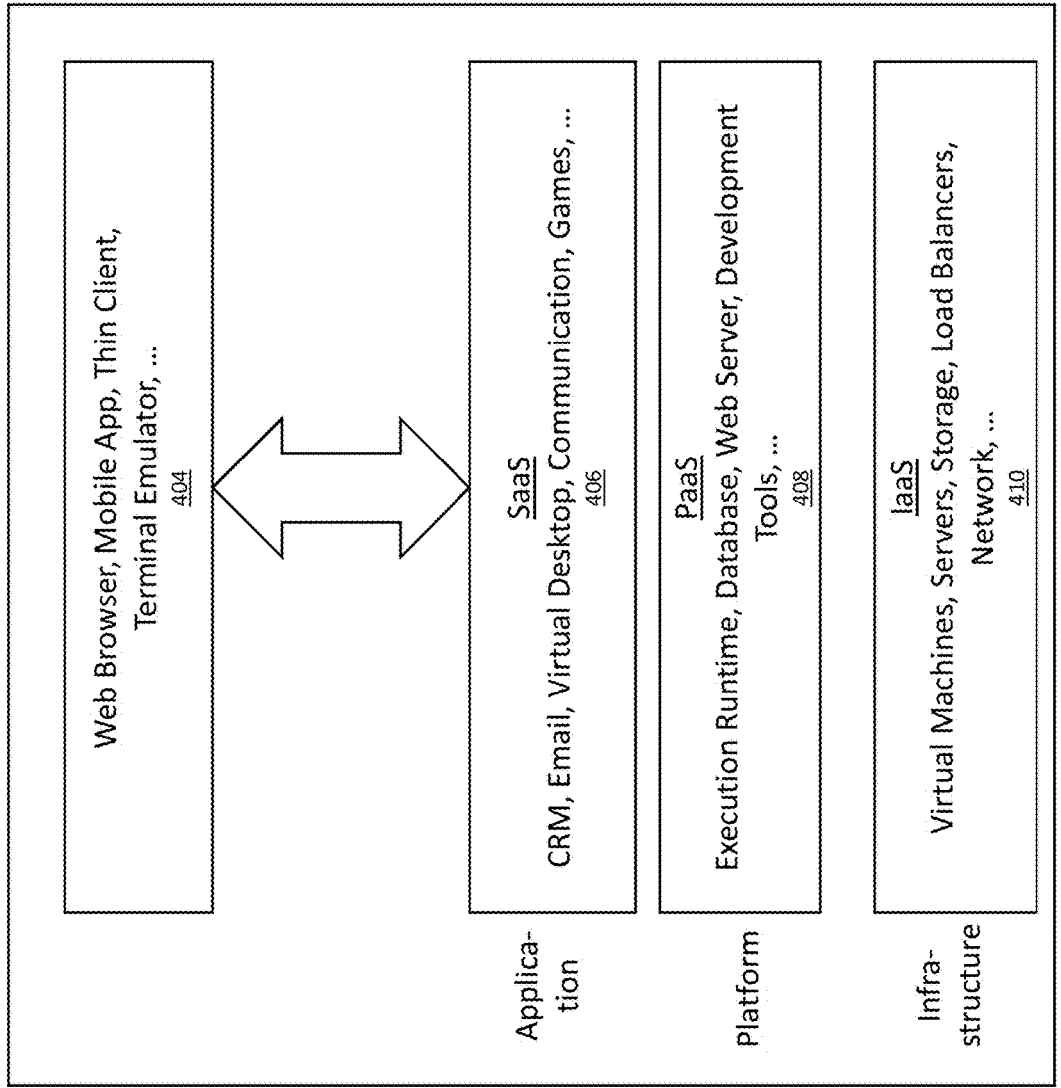

According to some embodiments shown by way of one example in FIG. 4, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 410, platform as a service (PaaS) 408, and/or software as a service (SaaS) 406. In some embodiments, such cloud architecture 406, 408, 410 may be utilized in connection with web browser and/or other network aspects, shown at 404, to provide implementations herein.

Figure 5:
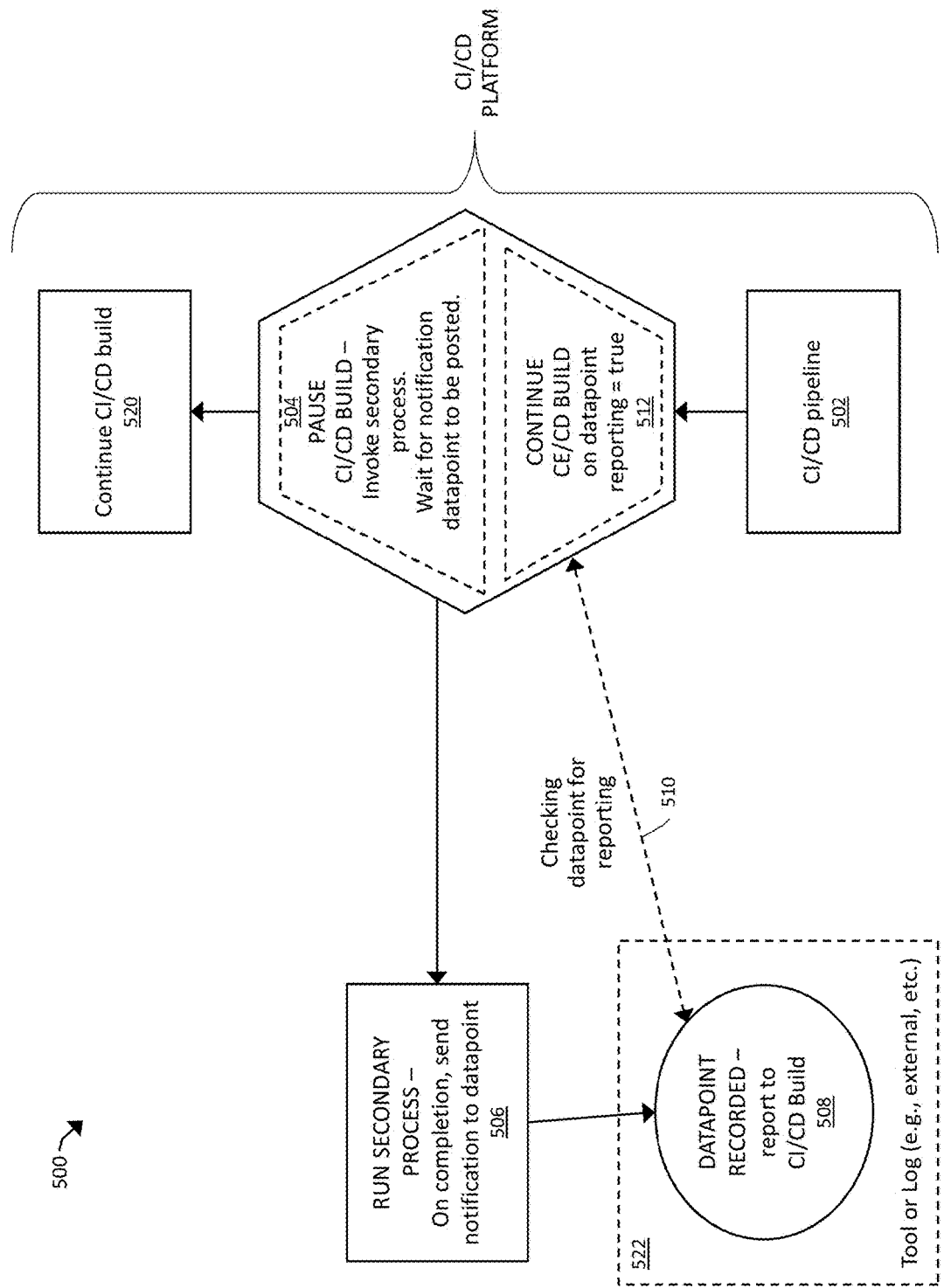
FIG. 5 is a high-level block diagram illustrating some exemplary features related to performing checkpoint and build processing associated with a CI/CD pipeline, consistent with exemplary aspects of certain embodiments of the present disclosure.

FIG. 5 is a high-level block diagram illustrating some exemplary features related to performing checkpoint and build processing associated with a CI/CD pipeline, consistent with exemplary aspects of certain embodiments of the present disclosure. Referring to FIG. 5, an exemplary CI/CD pipeline process begins by initiating the pipeline, at 502, which begins the CI/CD build and starts building the code and the deployment process. The build includes commencing a primary process and, eventually, the need to invoke at least one secondary process, such as a performance test, at which time the CI/CD build process is paused, at 504. At this point, the CI/CD build will wait and monitor the secondary process, which is being run, e.g., on a third-party platform. The secondary process is then executed, as shown at 506. Upon completion of the secondary process, a notification regarding completion (or intermediate status) is transmitted to a datapoint, at 508, which is on the third-party platform. At 508, the notification or datapoint is recorded and a sub-process is initiated to report the status information to the CI/CD build. A sub-process for performing such datapoint reporting is shown, at 510, by way of illustration. This reporting sub-process 510 may include periodic monitoring of the third-party platform, by the CI/CD pipeline, to see if the datapoint has been recorded. The CI/CD pipeline may perform such monitoring until the subject datapoint is recorded, and, further, the pipeline may also be configured with a timeout period and/or other wait instructions that will trigger an error in the build process if a timeout period has elapsed or other criteria is met. Once the secondary process is finished and posting of the datapoint has been verified to confirm completion, the CI/CD build may be unblocked and the pipeline may continue with the rest of the deployment. In some embodiments, for example, the CI/CD pipeline may use or assess the results of the secondary process (e.g., the results of performance tests, etc.) and proceed with the build.

According to certain embodiments, a tool or log 522, such as a monitoring tool or centralized log, which may be separate from the CI/CD pipeline may be utilized to perform the monitoring for datapoints, at 510. Here, for example, a separate monitoring tool of this nature may avoid issues with security and compliance considerations that may be associated with tools internal to the CI/CD platform or pipeline. In some embodiments, such a tool or log may be configured to detect and process only time-stamped datapoints associated with certain checkpoints, so that none of the actual data underlying the security or compliance concerns is ever transmitted or even known. Use of such disparate monitoring tool or centralized log is especially helpful with regard to certain data environments, such as those having severe data protection and data privacy restrictions, and/or are authorized to engage with only a limited subset of cloud-based services. Here, for example, embodiments that involve a monitoring tool configured to process such persisting, time-stamped datapoints in conjunction with configuring the monitoring tool and the CI/CD pipeline to operate with third parties via creation of secure or specialized data tunnels between the monitoring tool and both the third-party platforms and the CI/CD pipeline overcome substantial drawbacks existing in current attempts to coordinate or manage CI/CD dependent processes.

Figure 6:
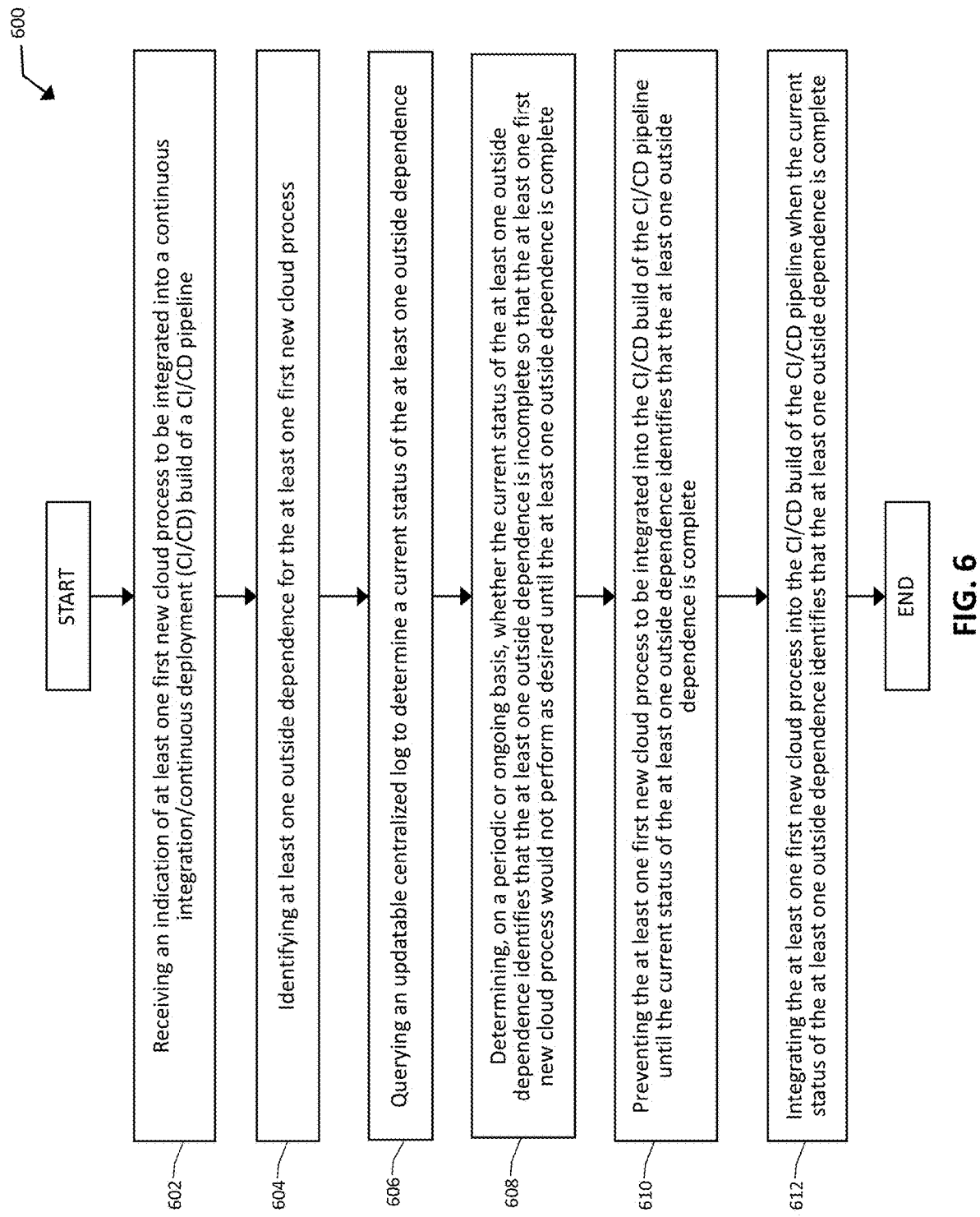
FIG. 6 is a flowchart illustrating one exemplary process related to performing checkpoint and build processing associated with a CI/CD pipeline, consistent with exemplary aspects of certain embodiments of the present disclosure.

FIG. 6 is a flowchart illustrating one exemplary process related to performing checkpoint and build processing associated with a CI/CD pipeline, consistent with exemplary aspects of certain embodiments of the present disclosure. As shown in FIG. 6, an exemplary checkpoint/build process 600 may include a series of six initial steps (602, 604, 606, 608, 610 and 612) which are shown in one exemplary sequence in FIG. 6 for the purpose of illustration, though may be composed of differing steps and/or performed in different order. Different sets, subsets and ordering of such steps may be performed in some implementations.

Referring to FIG. 6, an exemplary checkpoint/build process 600 may comprise: receiving an indication of at least one first new cloud process to be integrated into a continuous integration/continuous deployment (CI/CD) build of a CI/CD pipeline, at 602; identifying at least one outside dependence for the at least one first new cloud process, at 604, querying an updatable tool and/or log to determine a current status of the at least one outside dependence, at 606; determining on a periodic or ongoing basis, whether the current status of the at least one outside dependence identifies that the at least one outside dependence is incomplete so that the at least one first new cloud process would not perform as desired until the at least one outside dependence is complete, at 608; preventing the at least one first new cloud process to be integrated into the CI/CD build of the CI/CD pipeline until the current status of the at least one outside dependence identifies that the at least one outside dependence is complete, at 610; and integrating the at least one first new cloud process into the CI/CD build of the CI/CD pipeline when the current status of the at least one outside dependence identifies that the at least one outside dependence is complete.

According to embodiments of the disclosed technology, the at least one outside dependence may be based on one or both of a data resource dependence, and/or an execution of a related process. Further, in some embodiments, the updatable tool and/or log may be a centralized log configured to one or both of discover and monitor dependencies by continuously analyzing cloud processes of the CI/CD build.

With regard to the step of identifying at least one outside dependence for the at least one first new cloud process, at 604, the at least one outside dependence may comprise input data that is generated outside of one or both of: the at least one first new cloud process, and at least one computing activity performed outside of the at least one first new cloud process. According to certain embodiments, the input data being generated may include completion progress of one or more separate cloud processes on the one or more third-party platforms by tracking time-stamping datapoints transmitted from and/or existent on the one or more third-party platforms. Further, in some aspects, the outside dependency may comprises at least one third-party platform of the one or more third-party platforms, the at least one third-party platform include an entity associated with the CI/CD platform.

The overall checkpoint/build process 600 may also include one or more additional steps. For example, in one embodiment, the method may further comprise remotely monitoring the time-stamped datapoints existent on the third-party platforms, the remote monitoring being performed continuously as the time-stamped datapoints are being generated for internal use by the third-party platforms. Further, in another embodiment, the checkpoint/build process 600 may further comprise remotely monitoring the time-stamped datapoints existent on the third-party platforms, the remote monitoring being performed continuously as the time-stamped datapoints are being generated for internal use by the third-party platforms. According to still another embodiment, the checkpoint/build process 600 may further comprise pausing the CI/CD build to invoke and execute a secondary process on at least one of the third-party platforms, recording a completion datapoint regarding completion of the secondary process at the at least one of the third-party platforms, and transmitting to the CI/CD pipeline, upon completion of the secondary process, a notification that the completion datapoint has been recorded.

In some embodiments, with regard to the step of querying an updatable tool and/or centralized log to determine a current status of the at least one outside dependence, at 606, the updatable tool or log may be configured to obtain, in real-time, outside dependencies associated with the CI/CD build of the CI/CD pipeline. Further, with regard to the step of determining whether the current status of the at least one outside dependence, such current status may be determined by one or both of: (i) tracking datapoints transmitted from one or more third-party platforms associated with the outside dependence, and/or (ii) tracking the datapoints existent on the one or more third-party platforms.

According to yet another embodiment, the checkpoint/build process 600 may further comprise steps such as verifying status of the secondary process, e.g. via at least one computer processor performing the CI/CD build, by confirming or processing valid occurrences of the completion datapoint and/or the time-stamped datapoints, and continuing, upon confirmation of valid reporting of the completion datapoint, the CI/CD build based on information or feedback provided via analysis of the datapoints of the secondary process.

Figure 7:
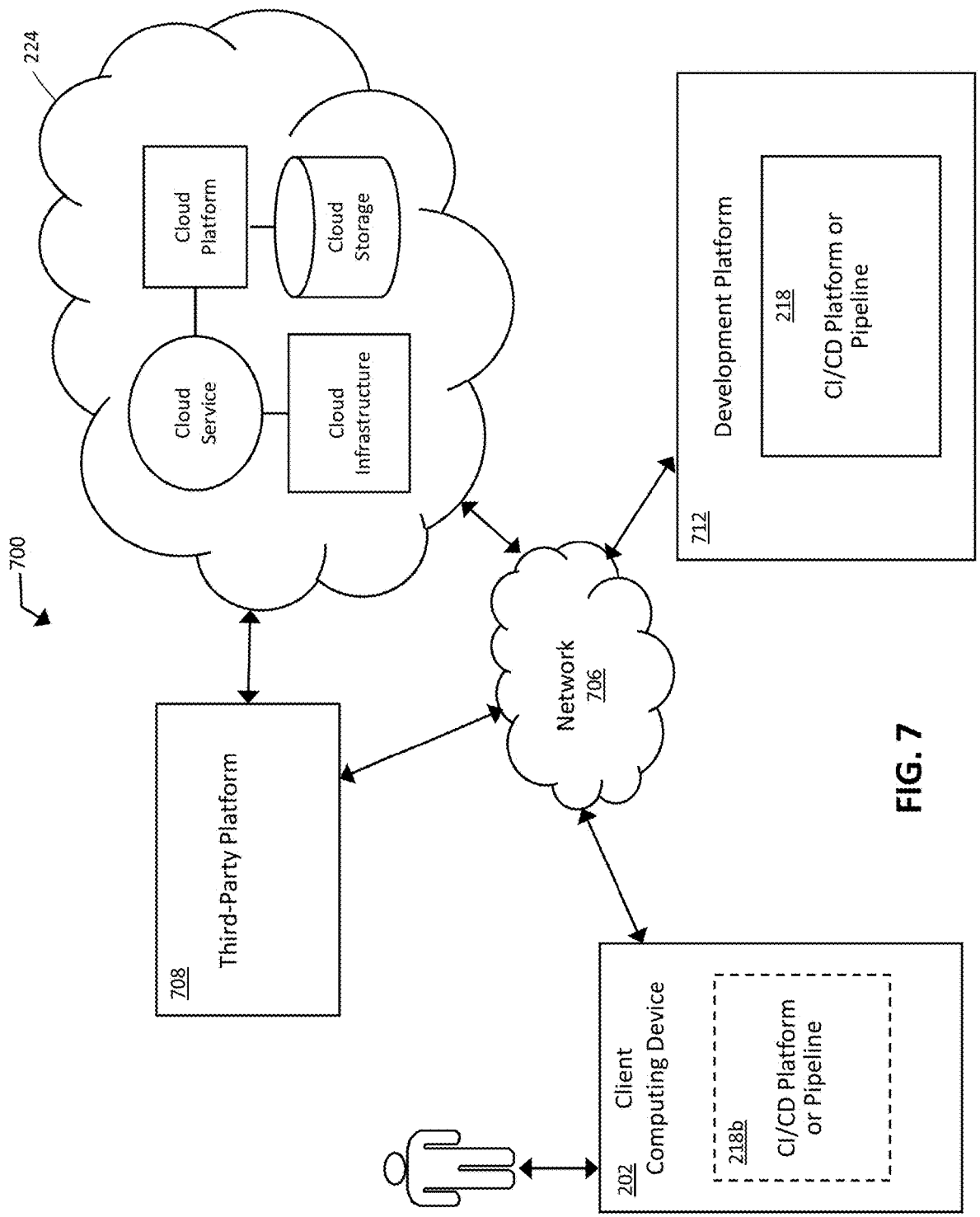
FIG. 7 is a block diagram of an exemplary system and/or platform that may involve features of checkpoint and build processing, consistent with exemplary aspects of certain embodiments of the present disclosure.

FIG. 7 is a block diagram of an exemplary system and/or platform 700 that may involve features of checkpoint and build processing, in accordance with certain embodiments of the present disclosure. System 700 may be configured for executing software applications, such as one or more applications corresponding to the CI/CD platform or pipeline 218 described above in connection with FIG. 2. As shown, system 700 may include a client 202, such as a client computing device or one or more other computing devices, and a network 706 connecting the various system elements. Such client 202 or computing device(s) may be configured to execute, among other programs, the CI/CD platform or pipeline 218, a portion of which may also reside on the client 202 as an application, at 218*b*. The CI/CD platform or pipeline 218 may be resident in a remote or cloud platform, or otherwise distributed among various servers and/or computing devices, such as a software development platform 712. System 700 may further include one or more third-party platforms, computers or systems 708, such as third-party platforms that perform the various cloud processes initiated by the CI/CD platform or pipeline 218 through the cloud 224. As shown, client computing device 202, third-party platform 708, and development platform 712 may be communicatively coupled by the network 706 and/or at least one cloud 224.

While only one client 202, third-party platform 708, development platform 712, network 706, and cloud 224 are typically shown and discussed, it will be understood that system 700 may include more than one of any of these components. More generally, the components and arrangement of the components included in system 700 may vary. Thus, system 700 may include other components that perform, or are associated with and/or assist in the performance of, one or more processes consistent with the disclosed embodiments.

In some embodiments, one or more clients 202 may include computing devices that are configured to and/or typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. Devices associated with clients 202 may also be capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more devices associated with clients 202 may include and/or may run one or more applications, such as Internet browsers, mobile applications, voice calls, video games, videoconferencing, and email, among others. In some embodiments, such devices may be configured to receive and to send web pages, and the like. In some embodiments, an exemplary specifically programmed network or cloud tool, such as a web browser application, consistent with the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, such devices may be specifically programmed by either Java, .Net, QT, C, C++ and/or other suitable programming language. In some embodiments, the devices may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

Network(s) 706 involved with such system 700 may include and/or involve specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 105 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 706 may include and implement, as an alternative or in conjunction with one or more of the above, a WiMAX architecture defined by the WiMAX forum. In some embodiments and, optionally, in combination of any embodiment described above or below, the exemplary network 706 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 706 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 706 may also include mass storage, such as network attached storage (NAS), a storage area network (SAN), a content delivery network (CDN) or other forms of computer- or machine-readable media.

In some embodiments, servers associated with clients 202, development platforms 712 and/or third-party platforms may be web or cloud servers (or a series of servers) running a network operating system, examples of which may include but are not limited to Microsoft Windows Server, Novell NetWare, or Linux. In some embodiments, such servers may be used for and/or provide cloud and/or network computing.

In some embodiments, one or more such servers may be specifically programmed to perform, in non-limiting example, as authentication servers, search servers, email servers, social networking services servers, SMS servers, IM servers, MIMS servers, exchange servers, photo-sharing services servers, advertisement providing servers, financial/banking-related services servers, travel services servers, or any similarly suitable service-base servers for users of the CI/CD platform or pipeline 218.

In some embodiments, various processors associated with the clients 202, platforms 708, 712, and cloud 224 may include one or more microprocessors, ASICs, state machines, and/or other such known computing and/or processing components. In some embodiments, the system components, servers and/or processors herein may include, or may be in communication with, media, for example computer-readable media, which stores instructions that, when executed by the various computing components, may cause relevant processors to perform one or more steps described herein. In some embodiments, examples of computer-readable media may include, but are not limited to, an electronic, optical, magnetic, or other storage or transmission device capable of providing a processor with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, computing devices associated with components of the system 700 may also comprise a number of external or internal devices such as a mouse, a CD-ROM, DVD, a physical or virtual keyboard, a display, or other input or output devices. In some embodiments, examples of computing devices, such as those associated with clients 202, may be any type of processor-based platforms that are connected to a network 706 such as, without limitation, personal computers, digital assistants, personal digital assistants, smart phones, pagers, digital tablets, laptop computers, Internet appliances, and other processor-based devices. In some embodiments, such computing devices may be specifically programmed with one or more application programs in accordance with one or more principles/methodologies detailed herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take form factors such as, without limitation, tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIGS. 8-9) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) Ios; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and/OR (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A computer-implemented method comprising:
 receiving, by at least one computer processor, an indication of at least one first new cloud process to be integrated into a continuous integration/continuous deployment (CI/CD) build of a CI/CD pipeline;
 identifying, by the at least one computer processor, at least one outside dependence for the at least one first new cloud process;
 wherein the at least one outside dependence comprises input data that is generated outside of one or both of: the at least one first new cloud process, and at least one computing activity performed outside of the at least one first new cloud process;
 querying, by the at least one computer processor, an updatable centralized log to determine a current status of the at least one outside dependence;
 wherein the updatable centralized log is configured to obtain, in real-time, outside dependencies associated with the CI/CD build of the CI/CD pipeline;
 determining, by the at least one computer processor, on a periodic or ongoing basis, whether the current status of the at least one outside dependence identifies that the at least one outside dependence is incomplete so that the at least one first new cloud process would not perform as desired until the at least one outside dependence is complete;
 wherein the current status is determined by one or both of:
 (i) tracking datapoints transmitted from one or more third-party platforms associated with the outside dependence; and (ii) tracking the datapoints existent on the one or more third-party platforms;

preventing, by the at least one computer processor, the at least one first new cloud process to be integrated into the CI/CD build of the CI/CD pipeline until the current status of the at least one outside dependence identifies that the at least one outside dependence is complete; and integrating, by the at least one computer processor, the at least one first new cloud process into the CI/CD build of the CI/CD pipeline when the current status of the at least one outside dependence identifies that the at least one outside dependence is complete.

Clause 2. The method of clause 1 or of any clause herein, wherein the input data being generated includes completion progress of one or more of separate cloud processes on the one or more third-party platforms by tracking time-stamping datapoints transmitted from and/or existent on the one or more third-party platforms.

Clause 3. The method of clause 2 or of any clause herein, wherein the outside dependency comprises at least one third-party platform of the one or more third-party platforms, the at least one third-party platform include an entity associated with the CI/CD platform.

Clause 4. The method of clause 2 or of any clause herein, further comprising:

remotely monitoring, by the at least one computer processor, the time-stamped datapoints existent on the one or more third-party platforms, the remote monitoring being performed continuously as the time-stamped datapoints are being generated for internal use by the third-party platforms.

Clause 5. The method of clause 2 or of any clause herein, further comprising:

remotely monitoring the time-stamped datapoints existent on the third-party platforms, the remote monitoring being performed continuously as the time-stamped datapoints are being generated for internal use by the third-party platforms.

Clause 6. The method of clause 2 or of any clause herein, further comprising:

pausing the CI/CD build to invoke and execute a secondary process on at least one of the third-party platforms;

recording a completion datapoint regarding completion of the secondary process at the at least one of the third-party platforms; and transmitting to the CI/CD pipeline, upon completion of the secondary process, a notification that the completion datapoint has been recorded.

Clause 7. The method of clause 2 or of any clause herein, further comprising:

verifying status of the secondary process, by the at least one computer processor performing the CI/CD build, by confirming or processing valid occurrences of the completion datapoint and/or the time-stamped datapoints; and continuing, upon confirmation of valid reporting of the completion datapoint, the CI/CD build based on information or feedback provided via analysis of the datapoints of the secondary process.

Clause 8. The method of clause 1 or of any clause herein, wherein the at least one outside dependence is based on a data resource dependence.

Clause 9. The method of clause 1 or of any clause herein, wherein the at least one outside dependence is based on an execution of a related process.

Clause 10. The method of clause 1 or of any clause herein, wherein the centralized log is configured to one or both of discover and monitor dependencies by continuously analyzing cloud processes of the CI/CD build.

Clause 11. A computer-implemented method comprising:

receiving, by at least one computer processor, an indication of at least one first new cloud process to be integrated into a continuous integration/continuous deployment (CI/CD) build of a CI/CD pipeline;

identifying, by the at least one computer processor, at least one outside dependence for the at least one first new cloud process;

wherein the at least one outside dependence comprises input data that is generated outside of one or both of: the at least one first new cloud process, and at least one computing activity performed outside of the at least one first new cloud process;

querying, by the at least one computer processor, an updatable centralized log to determine a current status of the at least one outside dependence;

wherein the updatable centralized log is configured to obtain, in real-time, outside dependencies associated with the CI/CD build of the CI/CD pipeline;

determining, by the at least one computer processor, on a periodic or ongoing basis, whether the current status of the at least one outside dependence identifies that the at least one outside dependence is incomplete so that the at least one first new cloud process would not perform as desired until the at least one outside dependence is complete;

wherein the current status is determined by:
  (i) tracking datapoints transmitted from one or more third-party platforms associated with the outside dependence; and
  (ii) tracking the datapoints existent on the one or more third-party platforms;

preventing, by the at least one computer processor, the at least one first new cloud process to be integrated into the CI/CD build of the CI/CD pipeline until the current status of the at least one outside dependence identifies that the at least one outside dependence is complete;

verifying the current status of the at least one outside dependence, by confirming or processing valid occurrences of the completion datapoint and/or ongoing datapoints; and continuing, upon confirmation of valid reporting of the completion datapoint, the CI/CD build based on information or feedback provided via analysis of the datapoints of the at least one outside dependence; and integrating, by the at least one computer processor, the at least one first new cloud process into the CI/CD build of the CI/CD pipeline when the current status of the at least one outside dependence identifies that the at least one outside dependence is complete.

Clause 12. The method of clause 11 or of any clause herein, wherein the input data being generated includes completion progress of one or more of separate cloud processes on the one or more third-party platforms by tracking time-stamping datapoints transmitted from and/or existent on the one or more third-party platforms.

Clause 13. The method of clause 12 or of any clause herein, wherein the outside dependency comprises at least one third-party platform of the one or more third-party platforms, the at least one third-party platform include an entity associated with the CI/CD platform.

Clause 14. The method of clause 12 or of any clause herein, further comprising:

remotely monitoring, by the at least one computer processor, the time-stamped datapoints existent on the third-party platforms, the remote monitoring being performed continuously as the time-stamped datapoints are being generated for internal use by the third-party platforms.

Clause 15. The method of clause 12 or of any clause herein, further comprising: remotely monitoring the time-stamped datapoints existent on the third-party platforms, the remote monitoring being performed continuously as the time-stamped datapoints are being generated for internal use by the third-party platforms.

Clause 16. The method of clause 12 or of any clause herein, further comprising:
pausing the CI/CD build to invoke and execute a secondary process on at least one of the third-party platforms;
recording a completion datapoint regarding completion of the secondary process at the at least one of the third-party platforms; and
transmitting to the CI/CD pipeline, upon completion of the secondary process, a notification that the completion datapoint has been recorded.

Clause 17. The method of clause 12 or of any clause herein, wherein the ongoing datapoints comprise time-stamped datapoints.

Clause 18. The method of clause 11 or of any clause herein, wherein the at least one outside dependence is based on a data resource dependence.

Clause 19. The method of clause 1 or of any clause herein, wherein the at least one outside dependence is based on an execution of a related process.

Clause 20. The method of clause 1 or of any clause herein, wherein the centralized log is configured to one or both of discover and monitor dependencies by continuously analyzing cloud processes of the CI/CD build.

Clause 21. In addition, embodiments herein may also take the form of one or more computer readable media containing computer-executable instructions for performing any of the processing herein, the computer-executable instructions being executable via one or more processing components to process instructions regarding and/or otherwise perform one or more aspects of the functionality set forth herein.

Clause 22. Embodiments herein may also take the form of a system comprised of computing elements and/or computer-readable media that are arranged, coupled, configured, programmed and/or otherwise adapted to perform the features and functionality set forth anywhere in the present disclosure.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A computer-implemented method comprising:
receiving, by at least one computer processor, an indication of at least one first new cloud process to be integrated into a continuous integration/continuous deployment (CI/CD) build of a CI/CD pipeline;
identifying, by the at least one computer processor, at least one outside dependence for the at least one first new cloud process;
wherein the at least one outside dependence comprises input data that is generated outside of one or both of: the at least one first new cloud process and at least one computing activity performed outside of the at least one first new cloud process, wherein the input data being generated includes completion progress of one or more separate cloud processes on one or more third-party platforms monitored by tracking time-stamped datapoints that have been generated by the one or more third-party platforms;
querying, by the at least one computer processor, an updatable centralized log to determine a current status of the at least one outside dependence;
wherein the updatable centralized log is configured to obtain outside dependencies associated with the CI/CD build of the CI/CD pipeline; and
wherein the updatable centralized log detects and processes only time-stamped datapoints associated with certain checkpoints;
determining, by the at least one computer processor, whether the current status of the at least one outside dependence identifies that the at least one outside dependence is incomplete so that the at least one first new cloud process would not perform as desired until the at least one outside dependence is complete; and
preventing, by the at least one computer processor, the at least one first new cloud process to be integrated into the CI/CD build of the CI/CD pipeline until the current status of the at least one outside dependence identifies that the at least one outside dependence is complete.

2. The method of claim 1 wherein the updatable centralized log is separately connected to both:
the CI/CD pipeline via a first secure data tunnel, and at least one authorized third-party platform via a second secure data tunnel.

3. The method of claim 1 further comprising:
integrating, by the at least one computer processor, the at least one first new cloud process into the CI/CD build of the CI/CD pipeline when the current status of the at least one outside dependence identifies that the at least one outside dependence is complete.

4. The method of claim 1 wherein the at least one outside dependence comprises recording or processing datapoint information from at least one third-party platform of the one or more third-party platforms, wherein the at least one third-party platform includes an entity associated with the CI/CD platform.

5. The method of claim 1 further comprising:
remotely monitoring, by the at least one computer processor, the time-stamped datapoints existent on the one or more third-party platforms, the remote monitoring being performed continuously as the time-stamped datapoints are being generated for internal use by the third-party platforms.

6. The method of claim 1 further comprising:
remotely monitoring the time-stamped datapoints existent on the third-party platforms, the remote monitoring being performed continuously as the time-stamped datapoints are being generated for internal use by the third-party platforms.

7. The method of claim 1 further comprising:
pausing the CI/CD build to invoke and execute a secondary process on at least one of the third-party platforms;
recording a completion datapoint regarding completion of the secondary process at the at least one of the third-party platforms; and
transmitting to the CI/CD pipeline, upon completion of the secondary process, a notification that the completion datapoint has been recorded.

8. The method of claim 1 further comprising:
verifying status of a secondary process, by the at least one computer processor performing the CI/CD build, by confirming or processing valid occurrences of a completion datapoint and/or the time-stamped datapoints; and continuing, upon confirmation of valid reporting of the completion datapoint, the CI/CD build based on information or feedback provided via analysis of datapoints of the secondary process.

9. The method of claim 1 wherein the at least one outside dependence is based on one or both of a data resource dependence and/or an execution of a related process.

10. The method of claim 1 wherein the centralized log is configured to one or both of discover and monitor dependencies by continuously analyzing cloud processes of the CI/CD build.

11. A computer-implemented method comprising:
receiving, by at least one computer processor, an indication of at least one first new cloud process to be integrated into a continuous integration/continuous deployment (CI/CD) build of a CI/CD pipeline;
identifying, by the at least one computer processor, at least one outside dependence for the at least one first new cloud process;
wherein the at least one outside dependence comprises input data that is generated outside of one or both of: the at least one first new cloud process and at least one computing activity performed outside of the at least one first new cloud process, wherein the input data being generated includes completion progress of one or more separate cloud processes on one or more third-party platforms monitored by tracking time-stamped datapoints that have been generated by the one or more third-party platforms;
querying, by the at least one computer processor, an updatable centralized log to determine a current status of the at least one outside dependence;
wherein the updatable centralized log detects and processes only time-stamped datapoints associated with certain checkpoints;
determining, by the at least one computer processor, whether the current status of the at least one outside dependence identifies that the at least one outside dependence is incomplete so that the at least one first new cloud process would not perform as desired until the at least one outside dependence is complete;
preventing, by the at least one computer processor, the at least one first new cloud process to be integrated into the C/CD build of the CI/CD pipeline until the current status of the at least one outside dependence identifies that the at least one outside dependence is complete;
verifying the current status of the at least one outside dependence, by confirming or processing valid occurrences of a completion datapoint and/or ongoing datapoints; and
continuing, upon confirmation of valid reporting of the completion datapoint, the CI/CD build based on information or feedback provided via analysis of the datapoints of the at least one outside dependence; and
integrating, by the at least one computer processor, the at least one first new cloud process into the CI/CD build of the CI/CD pipeline when the current status of the at least one outside dependence identifies that the at least one outside dependence is complete.

12. The method of claim 11 wherein no actual data underlying security or compliance returns is ever transmitted to or known by the CI/CD pipeline.

13. The method of claim 11 wherein the updatable centralized log is configured to obtain, in real-time, outside dependencies associated with the CI/CD build of the CI/CD pipeline.

14. The method of claim 11 wherein the at least one outside dependence comprises recording or processing datapoint information from at least one third-party platform of the one or more third-party platforms, wherein the at least one third-party platform includes an entity associated with the CI/CD platform.

15. The method of claim 11 further comprising:
remotely monitoring, by the at least one computer processor, the time-stamped datapoints existent on the third-party platforms, the remote monitoring being performed continuously as the time-stamped datapoints are being generated for internal use by the third-party platforms.

16. The method of claim 11 further comprising:
remotely monitoring the time-stamped datapoints existent on the third-party platforms, the remote monitoring being performed continuously as the time-stamped datapoints are being generated for internal use by the third-party platforms.

17. The method of claim 11 further comprising:
pausing the CI/CD build to invoke and execute a secondary process on at least one of the third-party platforms;
recording a completion datapoint regarding completion of the secondary process at the at least one of the third-party platforms; and
transmitting to the CI/CD pipeline, upon completion of the secondary process, a notification that the completion datapoint has been recorded.

18. The method of claim 11 wherein the ongoing datapoints comprise time-stamped datapoints.

19. The method of claim 11 wherein the at least one outside dependence is based on one or both of a data resource dependence and/or an execution of a related process.

20. The method of claim 11 wherein the centralized log is configured to one or both of discover and monitor dependencies by continuously analyzing cloud processes of the CI/CD build.

* * * * *